(12) United States Patent
Agarwal et al.

(10) Patent No.: US 11,695,653 B2
(45) Date of Patent: Jul. 4, 2023

(54) APPLICATION INTEGRATION MAPPING MANAGEMENT BASED UPON CONFIGURABLE CONFIDENCE LEVEL THRESHOLD

(71) Applicant: International Business Machines Corporation, Armonk, NY (US)

(72) Inventors: Matu Agarwal, Bangalore (IN); Mudit Mehrotra, Bangalore (IN); Jothiponsundar Radhakrishnan, Bangalore (IN)

(73) Assignee: International Business Machines Corporation, Armonk, NY (US)

(*) Notice: Subject to any disclaimer, the term of this patent is extended or adjusted under 35 U.S.C. 154(b) by 13 days.

(21) Appl. No.: 17/470,659

(22) Filed: Sep. 9, 2021

(65) Prior Publication Data
US 2023/0073463 A1    Mar. 9, 2023

(51) Int. Cl.
| | | |
|---|---|---|
| *H04L 29/08* | (2006.01) | |
| *H04L 41/5041* | (2022.01) | |
| *H04L 41/0226* | (2022.01) | |
| *H04L 41/16* | (2022.01) | |

(52) U.S. Cl.
CPC ...... *H04L 41/5048* (2013.01); *H04L 41/0226* (2013.01); *H04L 41/16* (2013.01)

(58) Field of Classification Search
None
See application file for complete search history.

(56) References Cited

U.S. PATENT DOCUMENTS

| | | | |
|---|---|---|---|
| 2019/0138509 A1* | 5/2019 | von Rickenbach | G06F 11/0793 |
| 2019/0332374 A1 | 10/2019 | Harner et al. | |
| 2020/0379780 A1 | 12/2020 | Sutton et al. | |
| 2021/0027182 A1* | 1/2021 | Harris | G06N 20/00 |

* cited by examiner

*Primary Examiner* — Adnan M Mirza
(74) *Attorney, Agent, or Firm* — The Steadman Law Firm PLLC

(57) ABSTRACT

Techniques are described with regard to application integration management. An associated computer-implemented method includes receiving from at least one user a request to map a plurality of data fields associated with a workflow during an application integration session and automatically mapping all data fields among the plurality of data fields for which a mapping confidence value is greater than or equal to a confidence level threshold set at a default value. The method further includes receiving mapping evaluations from each of the at least one user for each automatic data field mapping based upon the confidence level threshold set at the default value, processing at least one confidence level threshold adjustment input selection from one or more of the at least one user, and deriving at least one candidate default confidence level threshold value based upon the at least one confidence level threshold adjustment input selection.

20 Claims, 8 Drawing Sheets

Integration Session 1 for Workflow X

| | User | Total Fields | Auto Mapping | True Positives | False Positives | Precision | Avg Precision |
|---|---|---|---|---|---|---|---|
| Default Threshold 90% | 1 | 500 | 120 | 80 | 40 | 0.666666667 | |
| | 2 | 500 | 120 | 92 | 28 | 0.766666667 | |
| | 3 | 500 | 120 | 68 | 52 | 0.566666667 | 0.691666667 |
| | 4 | 500 | 120 | 98 | 22 | 0.816666667 | |
| | 5 | 500 | 120 | 77 | 43 | 0.641666667 | |
| First Adjusted Threshold 72% | 1 | 500 | 262 | 250 | 12 | 0.954198473 | |
| | 2 | 500 | 262 | 202 | 60 | 0.770992366 | |
| | 3 | 500 | 262 | 248 | 14 | 0.946564885 | 0.854198473 |
| | 4 | 500 | 262 | 185 | 77 | 0.70610687 | |
| | 5 | 500 | 262 | 234 | 28 | 0.893129771 | |
| Second Adjusted Threshold 60% | 1 | 500 | 380 | 280 | 100 | 0.736842105 | |
| | 2 | 500 | 380 | 350 | 30 | 0.921052632 | |
| | 3 | 500 | 380 | 302 | 78 | 0.794736842 | 0.789473684 |
| | 4 | 500 | 380 | 348 | 32 | 0.915789474 | |
| | 5 | 500 | 380 | 220 | 160 | 0.578947368 | |

FIG. 8

APPLICATION INTEGRATION MAPPING MANAGEMENT BASED UPON CONFIGURABLE CONFIDENCE LEVEL THRESHOLD

BACKGROUND

The various embodiments described herein generally relate to application integration management. More specifically, the various embodiments relate to managing application integration mapping associated with a workflow based upon configuration of a confidence level threshold.

SUMMARY

The various embodiments described herein provide techniques of optimizing application integration of workflows though mapping management. An associated computer-implemented method includes receiving from at least one user a request to map from at least one source application to a target application a plurality of data fields associated with a workflow during an application integration session and automatically mapping, via a machine learning mapping recommendation model, all data fields among the plurality of data fields for which a mapping confidence value is greater than or equal to a confidence level threshold set at a default value. The method further includes receiving mapping evaluations from each of the at least one user for each automatic data field mapping based upon the confidence level threshold set at the default value such that each automatic data field mapping approved by the user is labelled a true positive and each automatic data field mapping rejected by the user is labelled a false positive. The method further includes processing at least one confidence level threshold adjustment input selection from one or more of the at least one user and deriving at least one candidate default confidence level threshold value based upon the at least one confidence level threshold adjustment input selection. In an embodiment, the method further includes adjusting a default value setting associated with the confidence level threshold to an updated default value selected among the at least one candidate default confidence level threshold value. Optionally, selecting the updated default value includes analyzing, via the machine learning mapping recommendation model, each of the at least one candidate default confidence level threshold value in view of any mapping history associated with the at least one user. Additionally or alternatively, selecting the updated default value comprises analyzing, via the machine learning mapping recommendation model, each of the at least one candidate default confidence level threshold value in view of statistical precision calculated from mapping evaluation data. In an additional embodiment, the method further includes integrating the workflow during a subsequent application integration session based upon the confidence level threshold initially set at the updated default value.

One or more additional embodiments pertain to a computer program product including a computer readable storage medium having program instructions embodied therewith. According to such embodiment(s), the program instructions may be executable by a computing device to cause the computing device to perform one or more steps of and/or to implement one or more embodiments associated with the above recited computer-implemented method. One or more further embodiments pertain to a system having at least one processor and a memory storing an application program, which, when executed on the at least one processor, performs one or more steps of and/or implements one or more embodiments associated with the above recited computer-implemented method.

BRIEF DESCRIPTION OF THE DRAWINGS

So that the manner in which the above recited aspects are attained and can be understood in detail, a more particular description of embodiments, briefly summarized above, may be had by reference to the appended drawings.

Note, however, that the appended drawings illustrate only typical embodiments of this invention and are therefore not to be considered limiting of its scope, for the invention may admit to other equally effective embodiments.

FIG. 8 illustrates a table including data associated with an example application integration scenario, according to one or more embodiments.

DETAILED DESCRIPTION

Figure 1:
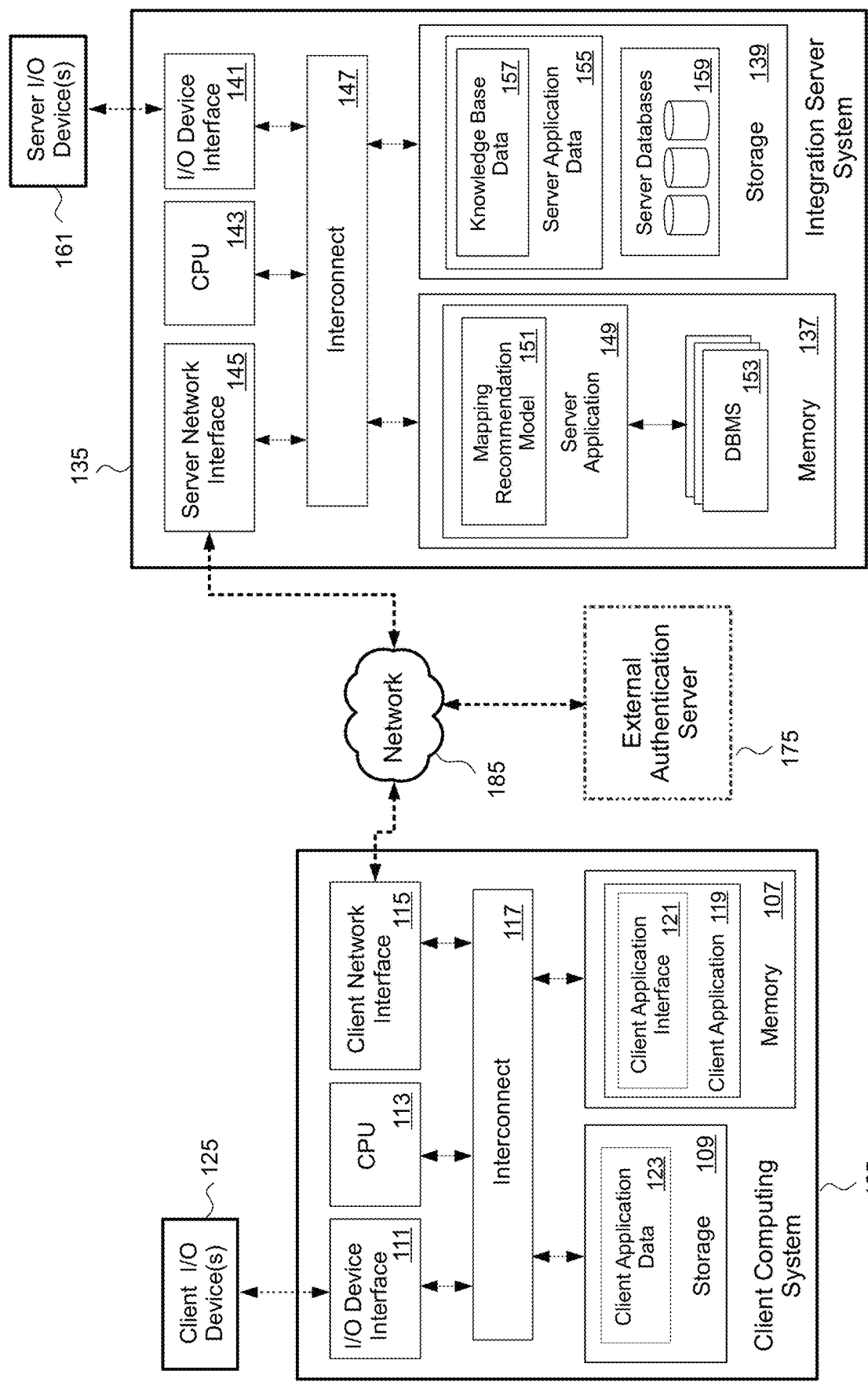
FIG. 1 illustrates a computing infrastructure, according to one or more embodiments.

The various embodiments described herein are directed to mapping management in the context of application integration. In the context of the various embodiments, application integration refers to constructing and optimizing one or more workflows associated with a set of applications, typically at least one source application and a target application. In the context of the various embodiments, application integration refers to adaptation of data aspects from one or more source applications to one or more target applications. Application integration facilitates workflow synergy between or among applications. Such workflow optimization entails mapping data fields associated with one or more integration nodes between or among applications. In the context of the various embodiments described herein, an integration node is representative of a source application workflow aspect integrated into a target application in the context of an application integration session. Application integration optionally encompasses one or more aspects of data governance and integration. The various embodiments address workflow construction and optimization by enabling adjustment of a confidence level threshold associated with automatic data field mapping based upon one or more user input selections during an application integration session.

The various embodiments described herein may have advantages over conventional techniques. Specifically, the various embodiments improve computer technology by permitting construction and optimization of an application integration flow through use of both user input and model-based artificial intelligence. Specifically, the various embodiments enable configuration of a confidence level threshold associated with automatic data field mapping in accordance with a machine learning mapping recommendation model. Confidence level threshold configuration is facilitated by user-initiated threshold adjustment. The various embodiments pertaining to application integration management are deployable within an on-premise server system associated with an organization (e.g., corporation, non-profit organization, or government entity), with different respective versions deployed at different releases. Since the machine learning mapping recommendation model associated with the various embodiments is customizable for a particular organization and optionally is configured to function only within such organization, both data privacy and organizational flexibility may be enhanced. Some of the various embodiments may not include all such advantages, and such advantages are not necessarily required of all embodiments.

In the following, reference is made to various embodiments of the invention. However, it should be understood that the invention is not limited to specific described embodiments. Instead, any combination of the following features and elements, whether related to different embodiments or not, is contemplated to implement and practice the invention. Furthermore, although embodiments may achieve advantages over other possible solutions and/or over the prior art, whether or not a particular advantage is achieved by a given embodiment is not limiting. Thus, the following aspects, features, embodiments, and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in one or more claims.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network, and/or a wireless network. The network may comprise copper transmission cables, optical transmission fibers, wireless transmission, routers, firewalls, switches, gateway computers, and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++, or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions also may be stored in a computer readable storage medium that can direct a computer, a programmable data processing apparatus, and/ or other devices to function in a particular manner, such that the computer readable storage medium having instructions stored therein comprises an article of manufacture including instructions which implement aspects of the function/act specified in the flowchart and/or block diagram block or blocks.

The computer readable program instructions also may be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Particular embodiments describe techniques relating to application integration management. However, it is to be understood that the techniques described herein may be adapted to a variety of purposes in addition to those specifically described herein. Accordingly, references to specific embodiments are included to be illustrative and not limiting.

FIG. 1 illustrates a computing infrastructure 100, according to an embodiment. As shown, computing infrastructure 100 includes a client computing system 105 and an integration server system 135, each connected to a communications network 185.

Illustratively, client computing system 105 includes, or is otherwise operatively coupled to, a memory 107, storage 109, an input/output (I/O) device interface 111, a central processing unit (CPU) 113, and a client network interface 115, all of which are interconnected via interconnect 117 (e.g., a bus). One or more aspects of client computing system 105 are accessed or controlled by one or more clients. Although shown as a single system, client computing system 105 is included to be representative of a single client computing system or multiple client computing systems. The one or more clients associated with client computing system 105 (or respective client computing systems 105) optionally include at least one user (a group or an individual) associated with an application integration session. In an embodiment, client computing system 105 is a thin client. Memory 107 includes a client application 119. In an embodiment, client application 119 is an online application configured for interfacing with integration server system 135 and other computing systems. Client application 119 includes a client application interface 121. In the event of multiple clients associated with one or more application integration sessions, multiple instances of client computing system 105 may be present, each having a respective client application 119 including at least one respective client application interface 121. Client application interface 121 includes a graphical user interface (GUI), a command line interface (CLI), and/or a sensory interface (e.g., capable of discerning and processing client sound/voice commands and/or client gestures). Client application interface 121 optionally includes an authentication interface for facilitating user authentication with respect to a user account associated with integration server system 135. Storage 109 includes client application data 123 associated with client application 119. One or more components of a GUI, a CLI, and/or a sensory interface included in client application interface 121 may facilitate receipt of client input and/or may facilitate display of client application data 123. Client application data 123 optionally includes data associated with an application integration session. I/O device interface 111 is communicatively coupled to client I/O device(s) 125 (e.g., touchscreen console, trackpad, joystick, microphone, speaker, etc.). The client(s) may interact with client application interface 121 via client I/O device(s) 125. CPU 113 is included to be representative of a single CPU, multiple CPUs, a single CPU having multiple processing cores, and the like. Client network interface 115 is configured to receive data from and transmit data to integration server system 135 via network 185.

Although shown as a single computing system, integration server system 135 is included to be representative of a single server system or multiple server systems. In an embodiment, integration server system 135 includes a single hardware server configured to provide hosting capabilities. In an alternative embodiment, integration server system 135 includes, or is otherwise operatively coupled to, a plurality of hardware and/or virtualized servers configured to provide hosting capabilities. In a further alternative embodiment, integration server system 135 is a cloud server system configured to provide distributed hosting capabilities via a plurality of computing nodes in a cloud computing environment. According to such further alternative embodiment, one or more of the plurality of computing nodes are configured to communicate with one another. Additionally, according to such further alternative embodiment, the cloud computing environment optionally offers infrastructure as a service (IaaS), platform as a service (PaaS), software as a service (SaaS), and/or other cloud computing services for which client computing system 105 or other systems associated with computing infrastructure 100 need not maintain resources locally.

Illustratively, integration server system 135 includes, or is otherwise operatively coupled to, memory 137, storage 139, an I/O device interface 141, a CPU 143, and a server network interface 145, all of which may be interconnected via interconnect 147 (e.g., a bus). Memory 137 includes a server application 149 configured to facilitate application integration during one or more application integration sessions in the context of the various embodiments described herein. Server application 149 includes or otherwise is operatively coupled to a machine learning mapping recommendation model representation 151. In an embodiment, server application 149 is configured to execute one or more artificial intelligence algorithms, e.g., utilizing one or more machine learning techniques, via machine learning mapping recommendation model representation 151. According to such embodiment, machine learning mapping recommendation model representation 151 includes or is otherwise operatively coupled to a machine learning mapping recommendation model and a knowledge base associated therewith. According to such embodiment, some or all aspects of the mapping recommendation model may run within integration server system 135. Additionally or alternatively, some or all aspects of the mapping recommendation model may run externally to integration server system 135, e.g., via a cloud-based implementation, in which case integration server system 135 communicates with or accesses such aspects of the mapping recommendation model via machine learning mapping recommendation model representation 151. In such case, machine learning mapping recommendation model representation 151 includes interface element(s) configured to interact with one or more aspects of the mapping recommendation model. Some or all aspects of the knowledge base optionally are incorporated into integration server system 135. Alternatively, some or all aspects of the knowledge base are externally located and communicatively coupled to integration server system 135. Memory 137 further includes or is otherwise operatively coupled to database management system (DBMS) 153. DBMS 153 is included to be representative of a single database system or multiple database systems. In an embodiment, server application 149 is configured to manage client authentication in the context of one or more application integration sessions. According to such embodiment, server application 149 is configured to authenticate, or is configured to facilitate authentication of, one or more clients associated with client computing system 105 and/or other client systems in computing infrastructure 100. In an alternative embodiment, server application 149 serves as an intermediary between client computing system 105 and an external authentication server 175 (e.g., a directory-based authentication server). According to such alternative embodiment, server application 149 sends authentication information associated with client computing system 105 and/or other client systems, either in original form or modified in a form to facilitate authentication, to external authentication server 175, which may in turn perform any authentication processing associated with one or more application integration sessions. According to such alternative embodiment, external authentication server 175 optionally is cloud-based and is communicatively coupled to elements of computing infrastructure 100 via network 185.

Storage 139 includes server application data 155. Server application 149 generates and processes server application data 155 based on interaction with other components of computing infrastructure 100. Server application data 155 includes knowledge base data 157 generated by, used by, or otherwise associated with the mapping recommendation model. Server application data 155, and optionally knowledge base data 157 more specifically, include datapoints pertaining to data integration sessions. Such datapoints include automatic data field mapping data, mapping evaluations received from application integration user(s) associated with client computing system 105 and/or other client system(s), and mapping confidence level threshold values such as default confidence level threshold values and candidate default confidence level threshold values. Knowledge base data 157 further includes other data associated with the knowledge base. Server application data 155 further includes precision values calculated based upon automatic data field mapping data and mapping evaluations. Storage 139 further includes server databases 159. DBMS 153 includes or interfaces with at least one software application configured to manage server databases 159. In an embodiment, server application 149 sends database requests to DBMS 153 and processes results returned by DBMS 153. In a further embodiment, server databases 159 include one or more relational databases. In an additional embodiment, server databases 159 include one or more ontology trees or other ontological structures. While FIG. 1 illustrates three server databases 159 in an example context, server system 135 (and more generally computing infrastructure 100) may include any number of databases. According to a further embodiment, DBMS 153 sends requests to remote databases (not shown) via network 185.

I/O device interface 141 is communicatively coupled to server I/O device(s) 161. CPU 143 is included to be representative of a single CPU, multiple CPUs, a single CPU having multiple processing cores, and the like. Server network interface 145 is configured to receive data from and transmit data to client computing system 105 or other client system(s) via network 185. Specifically, server application 149 is configured to accept requests sent by client computing system 105 or other client system(s) to integration server system 135 and is configured to transmit data to client computing system 105 or other client system(s) via server network interface 145. Furthermore, according to certain embodiments, server network interface 145 is configured to receive data from and/or transmit data to external authentication server 175.

Figure 2:
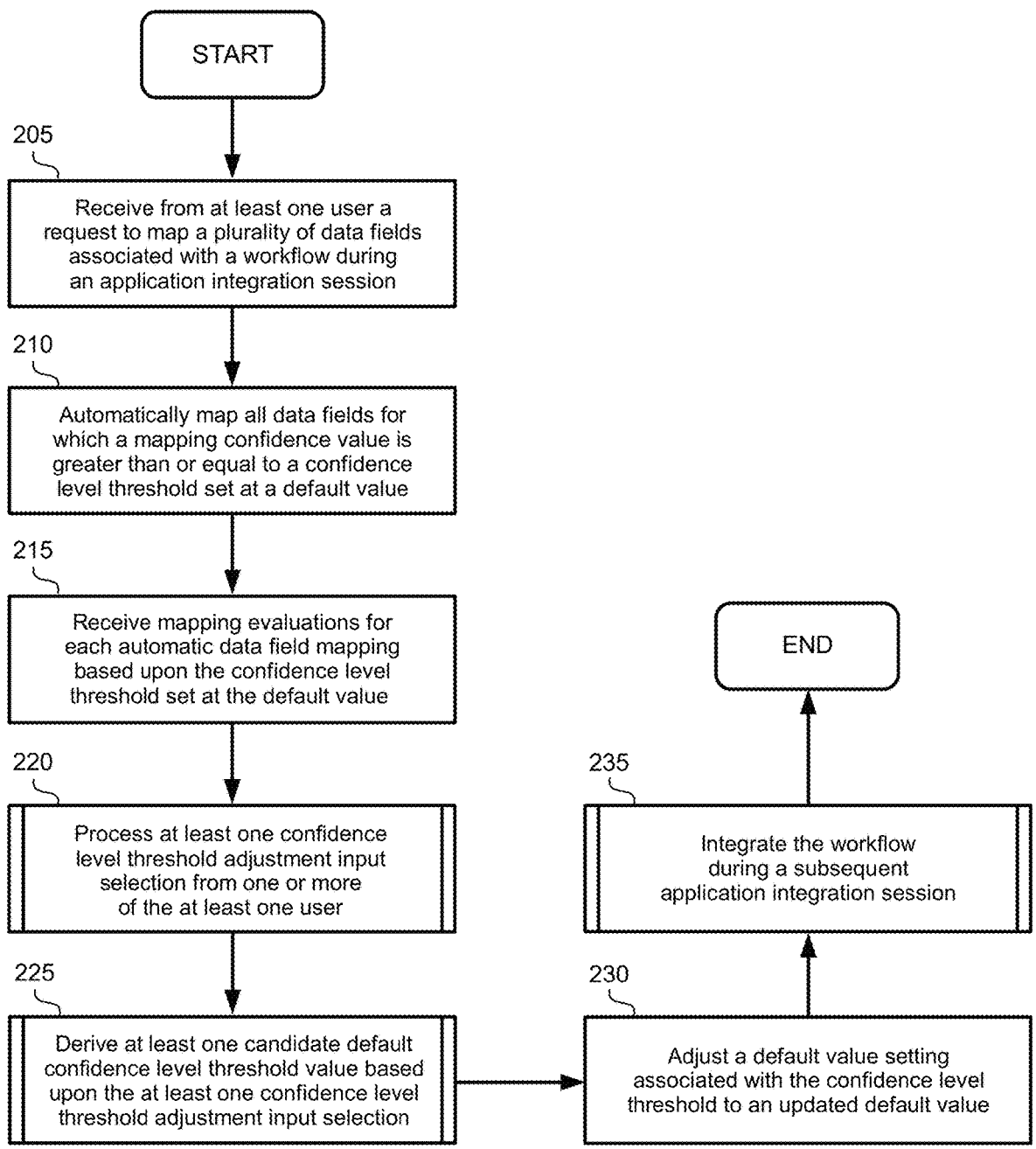
FIG. 2 illustrates a method of managing application integration, according to one or more embodiments.

FIG. 2 illustrates a method 200 of managing application integration. One or more steps associated with the method 200 and the other methods described herein optionally are carried out in a client-server computing environment (e.g., computing infrastructure 100) including a network (e.g., network 185). A server application in an integration server system of the client-server computing environment (e.g., server application 149 in integration server system 135 of computing infrastructure 100) facilitates processing according to the method 200 and the other methods described herein. The server application interacts with a user (or multiple users) via at least one user interface associated with at least one client application of a client computing system (e.g., client application interface 121 associated with client application 119 of client computing system 105). A user in the context of the method 200 and the other methods described herein is a client associated with application integration. Additionally or alternatively to the client-server computing environment, one or more steps associated with the method 200 and the other methods described herein optionally are carried out within one or more workloads of a cloud computing environment. Additionally or alternatively, one or more steps associated with the method 200 and the other methods described herein optionally are carried out in a peer-to-peer network environment, in which case one or more of the method steps described herein optionally are carried out via a peer application of a peer computing system.

In the context of the method 200 and the other methods described herein, the server application provides, or is capable of providing, a user (or legal representative(s) of the user) as well as any other authorized entity associated with application integration advance notice of any personal data collection. The server application further provides any affected entity an option to opt in or opt out of any such personal data collection at any time. Optionally, the server application further transmits at least one notification to any affected entity each time any such personal data collection occurs and/or at designated time intervals.

The method 200 begins at step 205, where the server application receives from at least one user a request to map from at least one source application to a target application a plurality of data fields associated with a workflow during an application integration session. According to step 205, the server application addresses a request from the at least one user to integrate a plurality of data fields associated with one or more integration nodes. A certain integration node optionally is associated with a workflow aspect of multiple source applications among the at least one source application. Alternatively, a certain integration node optionally is associated with a workflow aspect within a single source application among at least one source application. In an embodiment, the plurality of data fields include all data fields associated with the at least one source application. Alternatively, the plurality of data fields include a designated subset of data fields associated with one or more of the at least one source application. In an embodiment, the workflow is representative of a single workflow to be integrated. Alternatively, the workflow is representative of multiple workflows to be integrated. In the context of the various embodiments, an application integration session is associated with a set of users, e.g., the at least one user in the context of the method 200, completing integration of a workflow within predefined parameters such as a defined period of time or within a certain application environment.

At step 210, the server application automatically maps all data fields among the plurality of data fields for which a mapping confidence value is greater than or equal to a confidence level threshold set at a default value. The server application maps all data fields according to step 210 via a machine learning mapping recommendation model. The server application interfaces with a representation of the mapping recommendation model (e.g., mapping recommendation model representation 151). In an embodiment, the server application sets the confidence level threshold initially at the default value. According to such embodiment, the server application sets the confidence level threshold initially at the default value prior to any processing associated with the workflow optionally by initializing the confidence level threshold at the default value or alternatively by modifying the confidence level threshold to the default value from a previous value. In an additional embodiment, the default value is a same value for each of the at least one user associated with the application integration session. In a further embodiment, the server application refrains from automatically mapping any data field among the plurality of data fields for which a mapping confidence value is less than the confidence level threshold set at the default value. In a further embodiment, the server application determines the default value associated with the application integration session based upon the mapping recommendation model. The server application retrieves the default value based upon a default value setting associated with the server application, e.g., a default value application setting associated with the confidence level threshold. As further described herein, the server application determines the default value and/or one or more updates thereto based upon one or more user input adjustments to the confidence level threshold.

In the context of the various embodiments, a mapping is a proposed conversion (i.e., adaptation) of a data field from the at least one source application to the target application. In the context of the various embodiments, a data field is or includes a datapoint or a data classification associated with an application. A data field optionally is associated with an application data structure, e.g., a character, an array, or a linked list. Additionally or alternatively, a data field optionally is associated with an application database or ontology. Data field parameter or parameters mapped during application integration session(s) depend upon a respective user case. In an embodiment, a data type is a mapped parameter, in which case a mapping is a data type mapping that entails a proposed conversion of a data field from one or more data types associated with one or more of the at least one source application to one or more analogous data types associated with the target application. According to such embodiment, the server application optionally maps one or more data fields of certain data type(s) in the at least one source application to one or more analogous data fields of analogous data type(s) in the target application. In a related embodiment, a data type mapping is associated with a higher quantity or a lower quantity of data types and/or data fields in the target application compared with the at least one source application. According to such related embodiment, the server application optionally maps a single data field of a single data type in the at least one source application (e.g., string field "name") to multiple data fields of one or more data types in the target application (e.g., character field "first initial" and string field "last name"). Additionally or alternatively, the server application optionally maps multiple data fields of one or more data types in the at least one source application (e.g., numerical fields "identifier1" and "identifier2") to a single data field of a single data type in the target application (e.g., numerical field "identifier"). In an additional embodiment, a data format is a mapped parameter, in which case a mapping is a data format mapping that entails a proposed conversion of a data field from one or more data formats associated with one or more of the at least one source application to one or more analogous data formats associated with the target application. According to such additional embodiment, the server application optionally maps one or more data fields of certain data format(s) in the at least one source application (e.g., a certain numerical format) to one or more analogous data fields of analogous data format(s) in the target application (e.g., one or more analogous numerical formats). In a further embodiment, a variable is a mapped parameter, in which case a mapping is a variable mapping that entails a proposed conversion of a data field from one or more variables associated with one or more of the at least one source application to one or more analogous variables associated with the target application. In a further embodiment, a resource is a mapped parameter, in which case a mapping is a resource mapping that entails a proposed conversion of a data field from one or more resource associations in the context of one or more of the source application to one or more analogous resource associations in the context of the target application.

The automatic data field mappings are model-based mapping recommendations that may be accepted or rejected by each of the at least one user. The server application compares the mapping confidence value for a data field among the plurality of data fields to the confidence level threshold. Based upon such comparison, the server application determines which data fields to automatically map from the at least one source application to the target application. In an embodiment, the mapping confidence value for a data field is based upon a similarity score value that quantifies similarity between value(s) associated with data field(s) of the at least one source application and a corresponding values(s) associated with data field(s) of the target application. According to such embodiment, similarity optionally is quantified based upon syntax. In a further embodiment, the mapping confidence value for a data field and the confidence level threshold are respective values on a predefined scale.

According to such further embodiment, the mapping confidence value for a data field and the confidence level threshold are respective integer values on a predefined scale from 0 to 100. Alternatively, the mapping confidence value for a data field and the confidence level threshold are respective decimal values on a predefined normalized scale from 0.0 to 1.0. Alternatively, the mapping confidence value for a data field and the confidence level threshold are respective percentage values on a predefined percentage scale from 0% to 100%.

In an embodiment, the machine learning mapping recommendation model is deployed within an on-premise server system associated with an organization (e.g., corporation, non-profit organization, or government entity), with different respective versions deployed at different releases. According to such embodiment, the mapping recommendation model optionally is customized for a particular organization. Since the various embodiments do not require data sharing among organizations and optionally support functionality only within a single organization or within a designated group of organizations, the various embodiments facilitate data privacy.

In an embodiment, the server proceeds with automatically mapping the set of data fields according to step 210 responsive to receiving automatic mapping request(s) from one or more users among the at least one user. According to such embodiment, the server application optionally receives the automatic mapping request(s) via at least one user interface element selectable via at least one GUI. For instance, a user submitting a respective automatic mapping request optionally selects a user interface element in form of a button corresponding to a command to proceed with automatic mapping. Additionally or alternatively, the server application receives the automatic mapping request(s) via at least one CLI command. Additionally or alternatively, the server application receives the automatic mapping request(s) via a sensory interface configured to interpret user voice commands and/or user gestures. In an additional embodiment, the server application receives manual mappings from each of the at least one user for all data fields among the plurality of data fields for which a mapping confidence value is less than the confidence level threshold set at the default value. In the context of the various embodiments, for each manual mapping for a certain data field among the plurality of data fields, each of the at least one user optionally selects a mapping among multiple mapping choices for the certain data field. According to such additional embodiment, the server application optionally receives the manual mappings from at least one user interface element selectable by the user on at least one GUI. Additionally or alternatively, the server application receives the manual mappings from at least one CLI command. Additionally or alternatively, the server application receives the manual mappings via a sensory interface configured to interpret user voice commands and/or user gestures. In a further embodiment, the server application stores the automatic mappings and/or the manual mappings. According to such further embodiment, the server application stores such mappings in one or more databases (e.g., server databases 159) and/or in a knowledge base associated with the mapping recommendation model (e.g., among knowledge base data 157).

At step 215, the server application receives mapping evaluations from each of the at least one user for each automatic data field mapping based upon the confidence level threshold set at the default value, i.e., default value mapping evaluations. According to step 215, each automatic data field mapping approved by the user is labelled a true positive, and each automatic data field mapping rejected by the user is labelled a false positive. According to step 215, the server application receives mapping evaluations from each of the at least one user for each automatically mapped data field among the plurality of data fields based upon the confidence level threshold set at the default value. In an embodiment, the server application receives one or more of the mapping evaluations from respective user interfaces associated with respective users among the at least one user. According to such embodiment, the respective user interfaces include at least one GUI. Additionally or alternatively, the respective user interfaces include at least one CLI. Additionally or alternatively, the respective user interfaces include at least one sensory interface. In a further embodiment, the server application stores the mapping evaluations. According to such further embodiment, the server application stores such mapping evaluations in one or more databases and/or in the knowledge base associated with the mapping recommendation model.

At step 220, the server application processes at least one confidence level threshold adjustment input selection from one or more of the at least one user. Processing the at least one confidence level adjustment according to step 220 occurs based upon adjustment input selections made during the application integration session. In an embodiment, the application integration session lasts until, or at least until, each of the at least one user completes mapping of the plurality of data fields from the at least one source application to the target application. In an alternative embodiment, the application integration session lasts a predefined duration of time. A method of processing the at least one confidence level threshold adjustment input selection in accordance with step 220 is described with respect to FIG. 3.

At step 225, the server application derives at least one candidate default confidence level threshold value based upon the at least one confidence level threshold adjustment input selection. As further described below, the at least one candidate default confidence level threshold value includes candidate (i.e., potential) values for a default value setting associated with the confidence level threshold. In an embodiment, the server application facilitates update of the mapping recommendation model based upon the at least one confidence level threshold adjustment input selection, based upon precision calculations made with respect to the default confidence level threshold value and the adjusted confidence level threshold value(s), and/or based upon the derived at least one candidate default confidence level threshold value. In an additional embodiment, the server application stores the at least one candidate default confidence level threshold. According to such additional embodiment, the server application stores the at least one candidate default confidence level threshold in one or more databases and/or in the knowledge base associated with the mapping recommendation model. A method of deriving the at least one candidate default confidence level threshold value in accordance with step 225 is described with respect to FIG. 4.

At step 230, the server application adjusts a default value setting associated with the confidence level threshold to an updated default value selected among the at least one candidate default confidence level threshold value. The server application adjusts the default value setting associated with the confidence level threshold to the updated default value by selecting one of the at least one candidate default confidence level threshold value, i.e., by selecting a candidate default confidence level threshold value among the at least one candidate default confidence level threshold value.

The server application adjusts the default value setting to the updated default value without retraining the machine learning mapping recommendation model. In an embodiment, the server application selects a candidate default confidence level threshold value as the updated default value based upon mapping history and/or mapping calculations with respect to each of the at least one user, thus avoiding introduction of mapping selection bias from a single user or a subset of users among the at least one user. In an additional embodiment, the server application selects only a single updated default value among the at least one candidate default confidence level threshold value, e.g., for purposes of a subsequent application integration session. According to such additional embodiment, the server application provides such single updated default value to any subsequent user associated with a subsequent application integration session. In a further embodiment, the server application stores information associating the default value setting with the updated default value selected among the at least one candidate default confidence level threshold value in one or more databases and/or in the knowledge base associated with the mapping recommendation model.

In accordance with certain embodiments, selecting the updated default value according to step 230 includes analyzing, via the machine learning mapping recommendation model, each of the at least one candidate default confidence level threshold value in view of any mapping history associated with the at least one user. In an embodiment, the mapping history associated with the at least one user includes any mapping evaluations made by one or more of the at least one user. In an additional embodiment, the mapping history includes identical or analogous mappings associated with a respective user at different confidence level threshold values. In a further embodiment, the mapping history includes different mappings associated with a respective user at a same confidence level threshold value. Additionally or alternatively, the mapping history associated with the at least one user includes any mapping evaluations made by one or more users having a degree of similarity with one or more of the at least one user above a predefined user similarity threshold. Optionally, the server application applies similarity factors to determine degree of similarity between a respective user and one or more other users. Such similarity factors include user profession, user age, user demographic information, user application history, etc. In a further embodiment, the mapping history is cumulative, accumulating for the workflow being integrated over successive application integration sessions. According to such further embodiment, the server application analyzes subsequent application integration sessions based upon cumulative mapping history data from any previous application integration session. For instance, according to such further embodiment, for a second application integration session associated with the workflow being integrated, the server application analyzes mapping history from the first application integration session associated with the workflow being integrated. In another instance, according to such further embodiment, for a third application integration session associated with the workflow being integrated, the server application analyzes mapping history from both the first application integration session and the second application integration session associated with the workflow being integrated. In another instance, according to such further embodiment, for a fourth application integration session associated with the workflow being integrated, the server application analyzes mapping history from each of the first application integration session, the second application integration session, and the third application integration session associated with the workflow being integrated.

In accordance with certain embodiments, selecting the updated default value according to step 230 includes analyzing, via the machine learning mapping recommendation model, each of the at least one candidate default confidence level threshold value in view of statistical precision calculated from mapping evaluation data. In an embodiment, analyzing each of the at least one candidate default confidence level threshold value in view of statistical calculation on mapping evaluation data includes comparing precision calculations based upon any confidence level threshold modifications made during one or more previous application integration sessions. According to such embodiment, the server application optionally prioritizes respective candidate default confidence level thresholds among the at least one candidate default confidence level threshold by precision value, with highest priority assigned to a candidate default confidence level threshold value among the at least one candidate default confidence level threshold value associated with a highest average precision value. According to such embodiment, the server application selects as the updated default value a candidate default confidence level threshold value among the at least one candidate default confidence level threshold value associated with a highest average precision value. In an additional embodiment, the server application analyzes via the mapping recommendation model each of the at least one candidate default confidence level threshold value in view of both statistical precision calculation on mapping evaluation data and related user mapping history. The server application optionally reconciles various statistical precision calculations made over various application integration sessions with respect to integrating the plurality of data fields from the at least one source application to the target application based upon any mapping history associated with the at least one user and/or based upon any mapping history associated with one or more users having a degree of similarity with one or more of the at least one user above the predefined user similarity threshold. In a further embodiment, the server application applies mapping history as a tiebreaker between two candidate default confidence level threshold values having a same precision value and/or between a candidate default confidence level threshold value and the default value having a same precision value. According to such further embodiment, the server application optionally applies a tiebreaker based upon quantity of times a value is selected as an adjusted value by the at least one user in the context of the at least one confidence level threshold adjustment input selection.

At step 235, the server application integrates the workflow during a subsequent application integration session based upon the confidence level threshold initially set at the updated default value. The server application adjusts the confidence level threshold to the updated default value based upon adjustment of the default value setting associated with the confidence level threshold to the updated default value per step 230. A method of integrating the workflow during the subsequent application integration session in accordance with step 235 is described with respect to FIG. 7. The server application proceeds to the end of the method 200 once all application integration sessions associated with the workflow are completed, i.e., once all sets of users associated with the workflow have completed integration.

Figure 3:
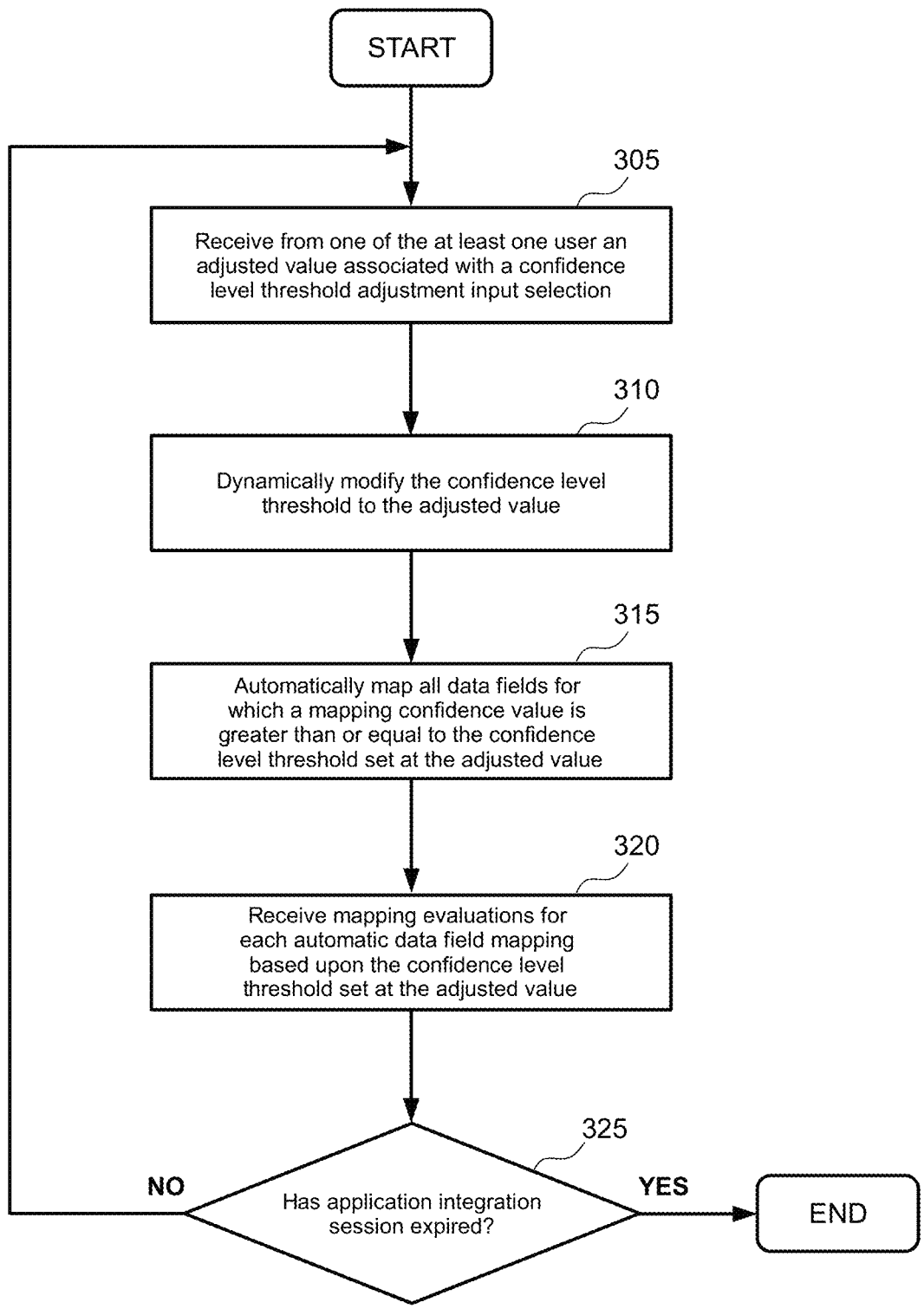
FIG. 3 illustrates a method of processing at least one confidence level threshold adjustment input selection from one or more of at least one user associated with an application integration session, according to one or more embodiments.

FIG. 3 illustrates a method 300 of processing the at least one confidence level threshold adjustment input selection. The method 300 provides one or more embodiments with respect to step 220 of the method 200. The method 300 begins at step 305, where the server application receives from one of the at least one user during the application integration session an adjusted value associated with a confidence level threshold adjustment input selection. According to step 305, one of the at least one user completes the confidence level threshold adjustment input selection by choosing the adjusted value. In an embodiment, one of the at least one user chooses the adjusted value and thus completes the confidence level threshold adjustment input selection, and the server application receives the adjusted value, via at least one user interface element of at least one user interface associated with a client computing system. According to such embodiment, the server application receives the adjusted value chosen via at least one user interface element in communication transmitted to the integration server system from the client computing system. In an additional embodiment, the server application receives the adjusted value associated with the confidence level threshold adjustment input selection via at least one user interface element adjustable by the user on a GUI. The at least one user interface element optionally includes an adjustable slider interface element with a sliding function and/or dragging function to adjust the confidence level threshold value. In a further embodiment, the server application receives the confidence level adjustment input from at least one user interface element accepting textual input from the user. The at least one user interface element accepting textual input optionally includes a text box interface element accepting a textual confidence level threshold value. The at least one user interface element accepting textual input optionally is or incorporates a software widget. In a further embodiment, the server application receives the confidence level threshold adjustment input according to step 305 from at least one user interface element permitting a user selection among one or more displayed options, i.e., predetermined options presented via the at least one user interface element. The at least one user interface element permitting a user selection optionally includes an interface element having set of radio buttons and/or a drop down menu interface element permitting selection of a confidence level threshold value. Additionally or alternatively, the server application receives the adjusted value associated with the confidence level threshold adjustment input selection via at least CLI command. Additionally or alternatively, the server application receives the adjusted value associated with the confidence level threshold adjustment input selection via at least one sensory interface command, e.g., a user voice command and/or a user gesture-based command detectable by at least one hardware component associated with the integration server system and transmissible to the server application. The confidence level threshold adjustment input selection received at step 305 is among the at least one confidence level threshold adjustment input selection to be processed according to step 220 and more specifically according to the method 300.

At step 310, the server application dynamically modifies the confidence level threshold to the adjusted value. In an embodiment, the server application dynamically modifies the confidence level threshold to the adjusted value by modifying the threshold immediately in response to receipt of the adjusted value associated with the at least one confidence level threshold adjustment input selection at step 305. The server application modifies the confidence level threshold to the adjusted value in preparation for automatic mapping based upon the threshold adjustment. At step 315, the server application automatically maps, via the machine learning mapping recommendation model, all data fields among the plurality of data fields for which a mapping confidence value is greater than or equal to the confidence level threshold set at the adjusted value. In an embodiment, the server application refrains from automatically mapping any data field among the plurality of data fields for which a mapping confidence value is less than the confidence level threshold set at the adjusted value. In a further embodiment, the server application receives manual mappings from each of the at least one user for all data fields among the plurality of data fields for which a mapping confidence value is less than the confidence level threshold set at the adjusted value. At step 320, the server application receives mapping evaluations from each of the at least one user for each automatic data field mapping based upon the confidence level threshold set at the adjusted value, i.e., adjusted value mapping evaluations. According to step 320, each automatic data field mapping approved by the user is labelled a true positive, and each automatic data field mapping rejected by the user is labelled a false positive. According to step 320, the server application receives mapping evaluations from each of the at least one user for each automatically mapped data field among the plurality of data fields based upon the confidence level threshold set at the adjusted value.

At step 325, the server application determines whether the application integration session has expired. Responsive to determining that the application integration session has expired, the server application proceeds to the end of the method 300. Responsive to determining that the application integration session has not expired, the server application returns to step 305 in order to address any additional received confidence level threshold adjustment input selection.

In sum, processing the at least one confidence level threshold adjustment input selection according to the method 300 includes receiving from one of the at least one user during the application integration session an adjusted value associated with a confidence level threshold adjustment input selection, dynamically modifying the confidence level threshold to the adjusted value, automatically mapping, via the machine learning mapping recommendation model, all data fields among the plurality of data fields for which a mapping confidence value is greater than or equal to the confidence level threshold set at the adjusted value, and receiving mapping evaluations from each of the at least one user for each automatic data field mapping based upon the confidence level threshold set at the adjusted value such that each automatic data field mapping approved by the user is labelled a true positive and each automatic data field mapping rejected by the user is labelled a false positive.

Figure 4:
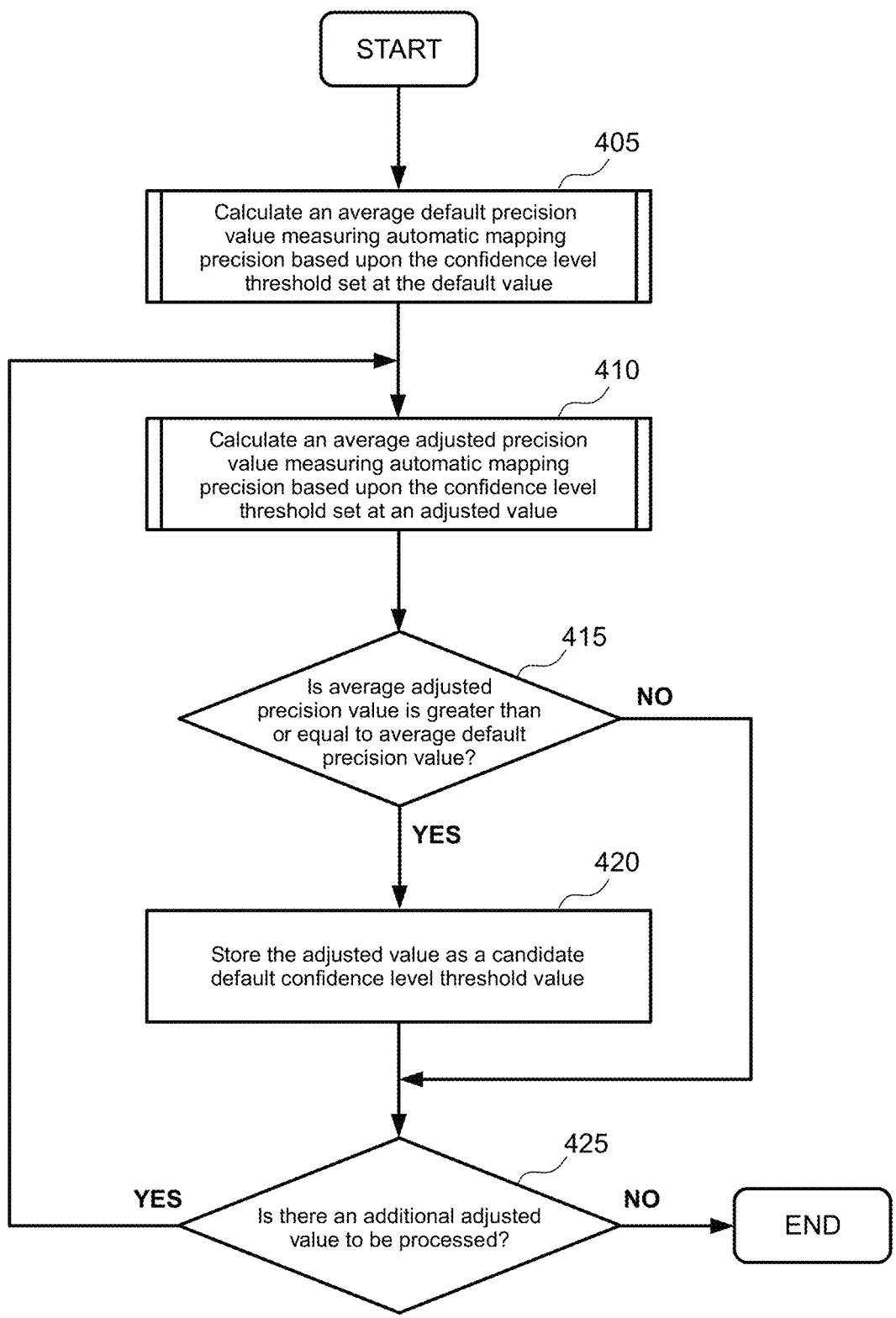
FIG. 4 illustrates a method of deriving the at least one candidate default confidence level threshold value associated with an application integration session, according to one or more embodiments.

FIG. 4 illustrates a method 400 of deriving the at least one candidate default confidence level threshold value. The method 400 provides one or more embodiments with respect to step 225 of the method 200. The method 400 begins at step 405, where the server application calculates an average default precision value measuring automatic mapping precision based upon the confidence level threshold set at the default value. A method of calculating the average default precision value in accordance with step 405 is described with respect to FIG. 5. At step 410, the server application calculates an average adjusted precision value measuring automatic mapping precision based upon the confidence level threshold set at an adjusted value associated with one of the at least one confidence level threshold adjustment input selection (i.e., a confidence level threshold adjustment input selection among the at least one confidence level threshold adjustment input selection). According to step

410, the adjusted value is a value selected by one of the at least one user consequent to the confidence level threshold adjustment input selection, e.g., a value received in accordance with step 305. A method of calculating the average adjusted precision value in accordance with step 410 is described with respect to FIG. 6.

At step 415, the server application determines whether the average adjusted precision value is greater than or equal to the average default precision value. Responsive to determining that the average adjusted precision value is not greater than or equal to (i.e., is less than) the average default precision value, the method 400 proceeds to step 425. Responsive to determining that the average adjusted precision value is greater than or equal to the average default precision value, at step 420 the server application stores the adjusted value as a candidate default confidence level threshold value among the at least one candidate default confidence level threshold value. As further described herein, in an embodiment the server application stores the adjusted value as a candidate default confidence level threshold value for purposes of adjusting the confidence level threshold to an updated default value for use in one or more subsequent application integration sessions. In an embodiment, the server application stores the adjusted value as a candidate default confidence level threshold value in one or more databases and/or in the knowledge base associated with the mapping recommendation model. According to such embodiment, the server application facilitates update of the mapping recommendation model based upon the adjusted value, such that the adjusted value is stored as a candidate value, e.g., in the context of determining an updated default value for the confidence level threshold.

At step 425, the server application determines whether there is an additional adjusted value to be processed associated with an additional one of the at least one confidence level threshold adjustment input selection, i.e., associated with an additional confidence level threshold adjustment input selection among the at least one confidence level threshold adjustment input selection. Responsive to determining that there is an additional adjusted value to be processed, the method returns to step 410 to calculate average adjusted precision value with respect to the additional adjusted value. Responsive to determining that there is no additional adjusted value to be processed, the server application proceeds to the end of the method 400.

In sum, deriving the at least one candidate default confidence level threshold value according to the method 400 includes calculating an average default precision value measuring automatic mapping precision based upon the confidence level threshold set at the default value, calculating an average adjusted precision value measuring automatic mapping precision based upon the confidence level threshold set at an adjusted value associated with one of the at least one confidence level threshold adjustment input selection, and, responsive to determining that the average adjusted precision value is greater than or equal to the average default precision value, storing the adjusted value as a candidate default confidence level threshold value among the at least one candidate default confidence level threshold value.

Figure 5:
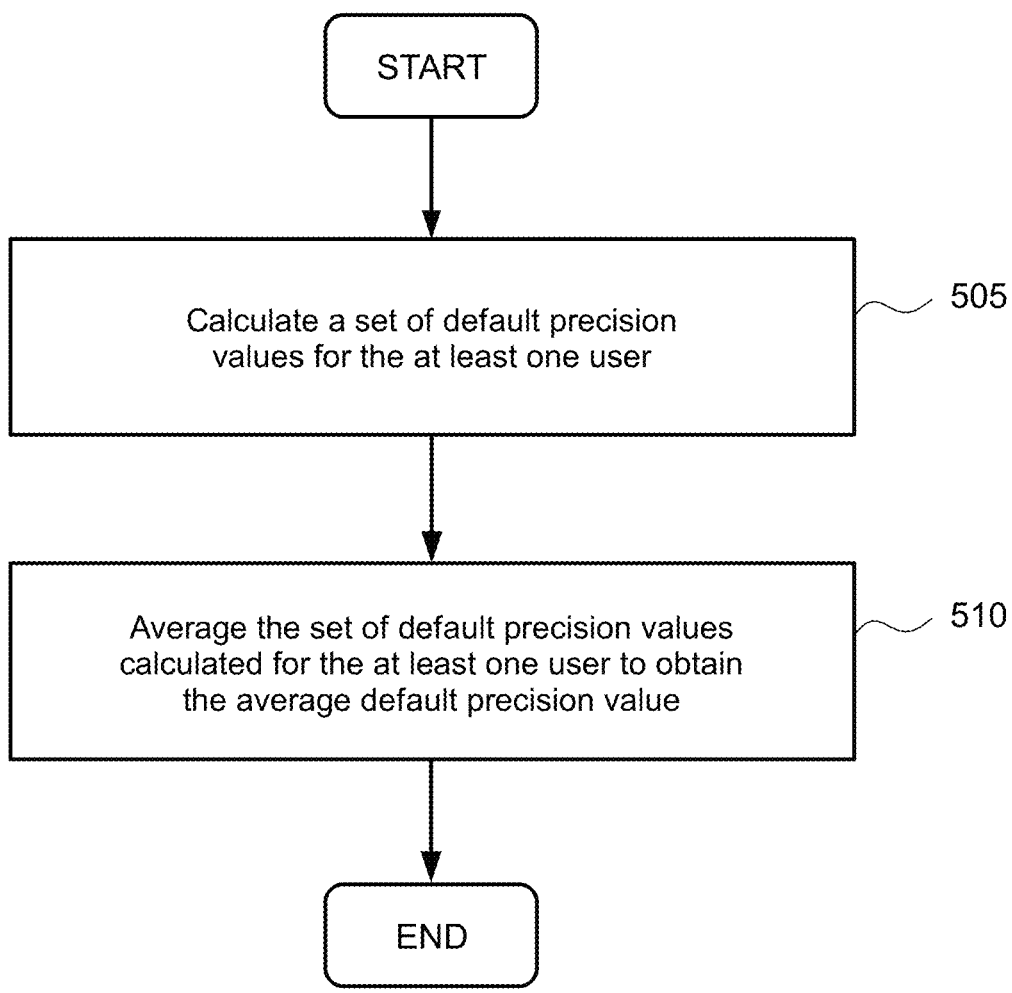
FIG. 5 illustrates a method of calculating an average default precision value associated with an application integration session, according to one or more embodiments.

FIG. 5 illustrates a method 500 of calculating the average default precision value. The method 500 provides one or more embodiments with respect to step 405 of the method 400. The method 500 begins at step 505, where the server application calculates a set of default precision values for the at least one user by computing a quantity of true positives divided by a sum of the quantity of true positives and a quantity of false positives as determined from the mapping evaluations based upon the confidence level threshold set at the default value. The set of default precision values includes a respective default precision value calculated for each of the at least one user. The server application calculates a default precision value among the set of default precision values for a respective user among the at least one user based upon a ratio of true positive quantity to a sum of true positive quantity and false positive quantity as determined from the default value mapping evaluations associated with the respective user. In an embodiment, the server application stores each of the set of default precision values to respective user profiles associated with each of the at least one user. According to such embodiment, the server application stores a default precision value calculated for a certain user in a user profile associated with the certain user. In a further embodiment, the server application stores the calculated set of default precision values in one or more databases and/or in the knowledge base associated with the mapping recommendation model. At step 510, the server application averages the set of default precision values calculated for the at least one user to obtain the average default precision value. According to step 510, the server application averages the respective default precision values calculated for each of the at least one user. In an embodiment, the server application stores the calculated average default precision value in one or more databases and/or in the knowledge base associated with the mapping recommendation model.

In sum, calculating the average default precision value according to the method 500 includes calculating a set of default precision values for the at least one user by computing a quantity of true positives divided by a sum of the quantity of true positives and a quantity of false positives as determined from the mapping evaluations based upon the confidence level threshold set at the default value. The method 500 further includes averaging the set of default precision values calculated for the at least one user to obtain the average default precision value.

Figure 6:
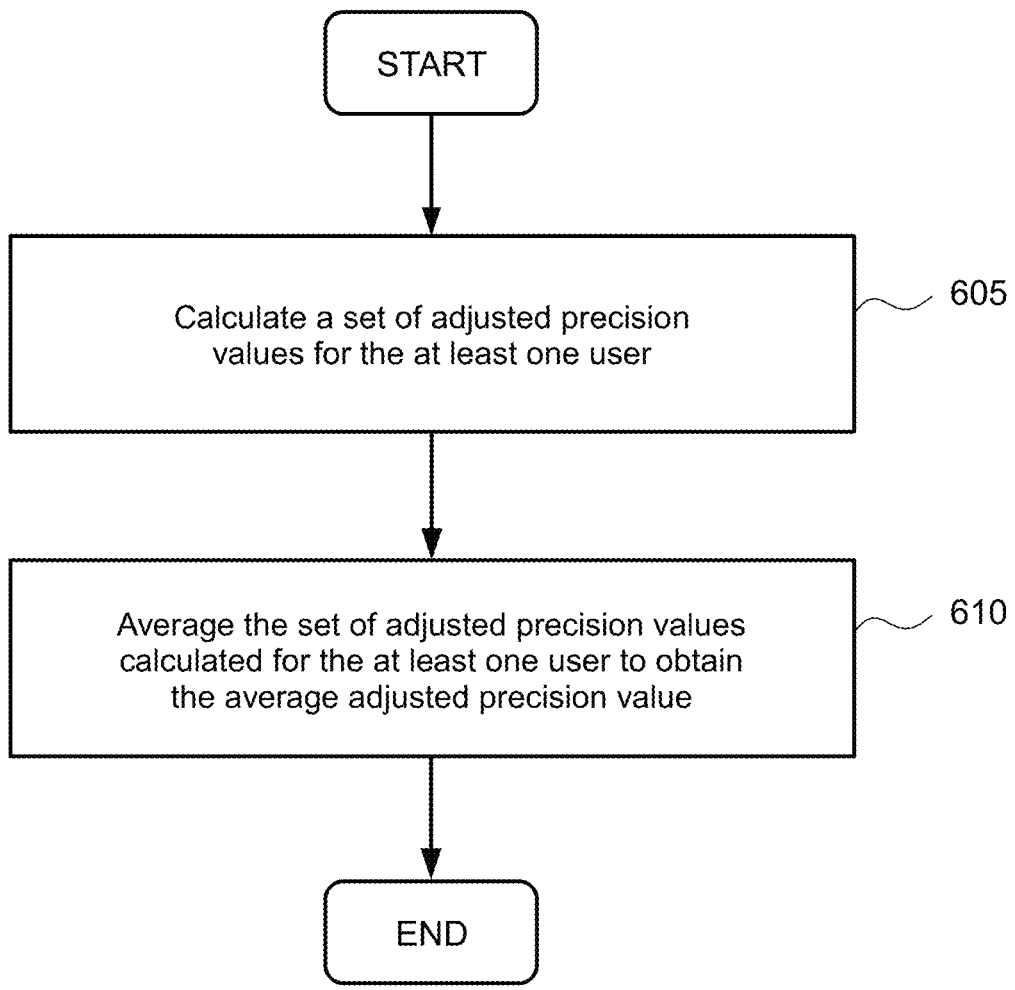
FIG. 6 illustrates a method of calculating an average adjusted precision value associated with an application integration session, according to one or more embodiments.

FIG. 6 illustrates a method 600 of calculating the average adjusted precision value. The method 600 provides one or more example embodiments with respect to step 410 of the method 400. The method 600 begins at step 605, where the server application calculates a set of adjusted precision values for the at least one user by computing a quantity of true positives divided by a sum of the quantity of true positives and a quantity of false positives as determined from the mapping evaluations based upon the confidence level threshold set at the adjusted value. The set of adjusted precision values includes an adjusted precision value calculated for each of the at least one user. The server application calculates an adjusted precision value among the set of adjusted precision values for a respective user among the at least one user based upon a ratio of true positive quantity to a sum of true positive quantity and false positive quantity as determined from the adjusted value mapping evaluations associated with the respective user. In an embodiment, the server application stores each of the set of adjusted precision values to respective user profiles associated with each of the at least one user. According to such embodiment, the server application stores an adjusted precision value calculated for a certain user in a user profile associated with the certain user. In a further embodiment, the server application stores the calculated set of adjusted precision values in one or more databases and/or in the knowledge base associated with the mapping recommendation model. At step 610, the server application averages the set of adjusted precision values calculated for the at least one user to obtain the average adjusted precision value. According to step 610, the server application averages the respective adjusted precision values calculated for each of the at least one user. In an embodiment, the server application stores the calculated average adjusted precision value in one or more databases and/or in the knowledge base associated with the mapping recommendation model.

In sum, calculating the average adjusted precision value according to the method 600 includes calculating a set of adjusted precision values for the at least one user by computing a quantity of true positives divided by a sum of the quantity of true positives and a quantity of false positives as determined from the mapping evaluations based upon the confidence level threshold set at the adjusted value. The method 600 further includes averaging the set of adjusted precision values calculated for the at least one user to obtain the average adjusted precision value.

Figure 7:
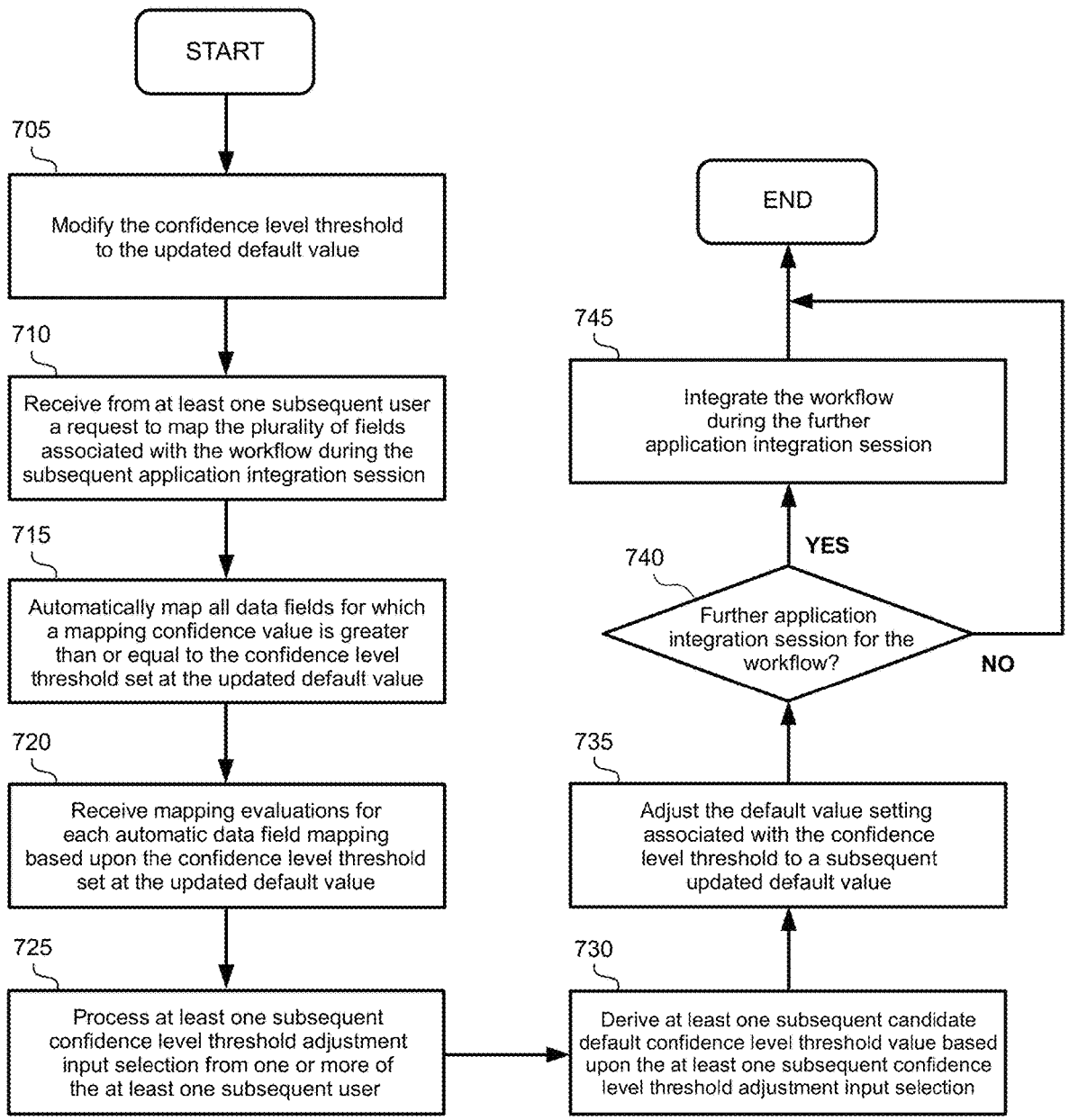
FIG. 7 illustrates a method of integrating a workflow during a subsequent application integration session, according to one or more embodiments.

FIG. 7 illustrates a method 700 of integrating the workflow during the subsequent application integration session. The method 700 provides one or more embodiments with respect to step 235 of the method 200. The method 700 begins at step 705, where the server application modifies the confidence level threshold to the updated default value. According to step 705, for purposes of the subsequent application session, the server application initially sets the confidence level threshold to the updated default value to which the server application adjusts the default value setting at step 230. At step 710, the server application receives from at least one subsequent user a request to map the plurality of fields associated with the workflow from the at least one source application to the target application during the subsequent application integration session. According to step 710, the server application addresses a request from the at least one subsequent user to integrate the plurality of data fields associated with one or more integration nodes. In an embodiment, the subsequent application integration session occurs during a time period following the application integration session. Alternatively, the subsequent application integration session occurs during a time period that partially overlaps with the time period of the application integration session.

At step 715, the server application automatically maps, via the machine learning mapping recommendation model, all data fields among the plurality of data fields for which a mapping confidence value is greater than or equal to the confidence level threshold set at the updated default value. In an embodiment, the updated default value is a same value for each of the at least one subsequent user associated with the subsequent application integration session. In an additional embodiment, the server application refrains from automatically mapping any data field among the plurality of data fields for which a mapping confidence value is less than the confidence level threshold set at the updated default value. In a further embodiment, the server application receives manual mappings from each of the at least one subsequent user for all data fields among the plurality of data fields for which a mapping confidence value is less than the confidence level threshold set at the updated default value. At step 720, the server application receives mapping evaluations from each of the at least one subsequent user for each automatic data field mapping based upon the confidence level threshold set at the updated default value, i.e., updated default value mapping evaluations. According to step 720, each automatic data field mapping approved by the subsequent user is labelled a true positive, and each automatic data field mapping rejected by the subsequent user is labelled a false positive. According to step 720, the server application receives mapping evaluations from each of the at least one subsequent user for each automatically mapped data field among the plurality of data fields based upon the confidence level threshold set at the updated default value.

At step 725, the server application processes at least one subsequent confidence level threshold adjustment input selection from one or more of the at least one subsequent user. Processing the at least one subsequent confidence level adjustment according to this step occurs based upon adjustment input selections made during the subsequent application integration session. In an embodiment, the subsequent application integration session lasts until, or at least until, each of the at least one subsequent user completes mapping of the plurality of data fields from the at least one source application to the target application. In an alternative embodiment, the subsequent application integration session is a predefined duration of time. In a further embodiment, processing the at least one subsequent confidence level adjustment input selection from one or more of the at least one subsequent user according to step 725 is analogous to processing the at least one confidence level threshold adjustment input selection from one or more of the at least one user according to step 220. Hence, according to one or more embodiments pertaining to processing the at least one subsequent confidence level adjustment input selection, the server application optionally executes steps analogous to those described with respect to the method 300.

At step 730, the server application derives at least one subsequent candidate default confidence level threshold value based upon the at least one subsequent confidence level threshold adjustment input selection. In an embodiment, the server application facilitates update of the mapping recommendation model based upon the at least one subsequent confidence level threshold adjustment input selection, based upon precision calculations made with respect to the updated default confidence level threshold value and the subsequent adjusted confidence level threshold value(s), and/or based upon the derived at least one subsequent candidate default confidence level threshold value. In an additional embodiment, the server application stores the at least one subsequent candidate default confidence level threshold. According to such additional embodiment, the server application stores the at least one subsequent candidate default confidence level threshold in one or more databases and/or in the knowledge base associated with the mapping recommendation model. According to such additional embodiment, the server application stores information associating the updated default threshold with the at least one subsequent candidate default confidence level threshold in the context of the mapping recommendation model. In a further embodiment, deriving the at least one subsequent candidate default confidence level threshold value according to step 730 is analogous to deriving the at least one candidate default confidence level threshold value according to step 225. Hence, according to one or more embodiments pertaining to deriving the at least one subsequent candidate default confidence level threshold value, the server application optionally executes steps analogous to those described with respect to the method 400.

At step 735, the server application adjusts the default value setting associated with the confidence level threshold to a subsequent updated default value selected among the at least one subsequent candidate default confidence level threshold value. The server application adjusts the default value setting associated with the confidence level threshold to the subsequent updated default value by selecting one of the at least one subsequent candidate default confidence level threshold value, i.e., selecting a subsequent candidate default confidence level threshold value among the at least one subsequent candidate default confidence level threshold value. The server application adjusts the default value setting to the subsequent updated default value without retraining the machine learning mapping recommendation model. In an embodiment, adjusting the default value setting to the subsequent updated default value according to step 735 is analogous to adjusting the default value setting to the updated default value according to step 230.

At step 740, the server application determines whether there is a further application integration session for the workflow. Responsive to determining that there is no further application integration session for the workflow, the server application proceeds to the end of the method 700. Responsive to determining that there is a further application integration session for the workflow, at step 745 the server application integrates the workflow during the further application integration session based upon the confidence level threshold initially set at the subsequent updated default value, based upon adjustment of the default value setting at step 735. The server application integrates the workflow according to step 745 during the further application integration session via steps analogous to those described with respect to the method 700. Such steps optionally include modifying the confidence level threshold to the subsequent updated default value selected according to step 735 and proceeding with automatic mapping and receipt of mapping evaluations based upon the subsequent updated default value upon receiving a mapping request from at least one further user. Optionally, responsive to determining that there are one or more additional application integration sessions beyond the further application integration session, the server application integrates the workflow during the one or more additional application integration sessions via steps analogous to those described with respect to the method 700. Such analogous steps optionally include successive adjustments(s) of the default value setting associated with the confidence level threshold for each respective additional application integration session analogous to the default value setting adjustment made at step 735.

In sum, integrating the workflow during the subsequent application integration session according to the method 700 includes modifying the confidence level threshold to the updated default value, receiving from at least one subsequent user a request to map the plurality of fields associated with the workflow from the at least one source application to the target application during the subsequent application integration session, and automatically mapping, via the machine learning mapping recommendation model, all data fields among the plurality of data fields for which a mapping confidence value is greater than or equal to the confidence level threshold set at the updated default value. The method 700 further includes receiving mapping evaluations from each of the at least one subsequent user for each automatic data field mapping based upon the confidence level threshold set at the updated default value such that each automatic data field mapping approved by the subsequent user is labelled a true positive and each automatic data field mapping rejected by the subsequent user is labelled a false positive, processing at least one subsequent confidence level threshold adjustment input selection from one or more of the at least one subsequent user, and deriving at least one subsequent candidate default confidence level threshold value based upon the at least one subsequent confidence level threshold adjustment input selection.

The various embodiments facilitate application integration of the workflow with respect to the plurality of data fields from the at least one source application to the target application based upon mapping evaluations received from the at least one user during the (first) application integration session as described in the method 200. The various embodiments further facilitate application integration of the workflow with respect to the plurality of data fields from the at least one source application to the target application based upon mapping evaluations received from the at least one subsequent user during the subsequent (second) application integration session as described in the method 700. The various embodiments facilitate adjustment of the default value setting to the updated default value according to step 230 for purposes of the subsequent (second) application integration session as described in the method 700 based upon cumulative mapping history and/or statistical precision calculation derived from mapping evaluations of automatic data field mappings received from the at least one user associated with the (first) application integration session. If applicable, the various embodiments further facilitate application integration of the workflow with respect to the plurality of data fields from the at least one source application to the target application based upon mapping evaluations received from the at least one further user during the further (third) application integration session as referenced at step 745. The various embodiments facilitate adjustment of the default value setting to the subsequent updated default value according to step 735 for purposes of the further (third) application integration session as referenced at step 745 based upon cumulative mapping history and/or statistical precision calculation derived from mapping evaluations of automatic data field mappings received from both the at least one user associated with the (first) application integration session and the at least one subsequent user associated with the subsequent (second) application integration session. The various embodiments optionally facilitate further integration of the workflow during additional application integration sessions beyond the further (third) application integration session, if applicable. In sum, the various embodiments facilitate update of the default value setting for each successive application integration session based upon cumulative mapping history and/or statistical precision calculation derived from mapping evaluations of automatic data field mappings received from users in previous application integration sessions.

FIG. 8 illustrates a table 800 in the context of an example application integration scenario describing application of steps of the methods 200-600. According to the example scenario, per step 205 the server application receives from at least one user, specifically User 1, User 2, User 3, User 4, and User 5 as indicated by user column 820 of table 800, a request to map from at least one source application, e.g., Source Application A and Source Application B, to a target application, e.g., Target Application C, a plurality of data fields associated with a workflow, e.g., Workflow X, during an example application integration session, e.g., Integration Session 1 for Workflow X. Table 800 includes metrics associated with Integration Session 1 for Workflow X. Per step 210, the server application automatically maps, via the machine learning mapping recommendation model previously described, all data fields among the plurality of data fields for which a mapping confidence value is greater than or equal to a confidence level threshold set at a default value. For purposes of this example scenario, it is assumed that the default confidence level threshold value is 90%, as indicated in threshold value column 810 of table 800. Accordingly, per step 210 the server application automatically maps from Source Application A and Source Application B to Target Application C all data fields associated with Workflow X for which a mapping confidence value meets or exceeds the default confidence level threshold value of 90%, or, e.g., 90 on a predefined scale from 0 to 100. According to such example scenario, there are 500 total data fields to be mapped by the server application, as indicated by column 830 of table 800. As indicated by the row set 802 of column 840 of table 800 associated with the default threshold value, per step 210 the server application automatically maps 120 data fields out of the 500 total data fields based upon the default threshold value. Per step 215, the server application receives mapping evaluations from each of Users 1-5 for each automatic data field mapping based upon the confidence level threshold set at the default value of 90%, such that each automatic data field mapping approved by the user is labelled a true positive and each automatic data field mapping rejected by the user is labelled a false positive. The true positive mappings associated with the default threshold value of 90%, i.e., the automatic data field mappings that are user-approved, are reflected in the row set 802 of column 850 of table 800. The false positive mappings associated with the default threshold value of 90%, i.e., the automatic data field mappings that are user-rejected, are reflected in the row set 802 of column 860 of table 800.

Per step 220, in the context of the example scenario, the server application processes at least one confidence level threshold adjustment input selection made during Integration Session 1 from one or more of Users 1-5. More specifically, per step 305 of the method 300, the server application receives from one of Users 1-5 a first adjusted value associated with a first confidence level threshold adjustment input selection during the application integration session. As indicated in threshold value column 810 of table 800, it is assumed for purposes of the example scenario that the first adjusted value received from one of Users 1-5 is 72%, or, e.g., 72 on the predefined scale from 0 to 100. Per step 310, the server application adjusts the confidence level threshold value from the default threshold value of 90% to the first adjusted threshold value of 72%. Per step 315, the server application automatically maps, via the mapping recommendation model, all data fields among the plurality of data fields for which a mapping confidence value is greater than or equal to the confidence level threshold set at the first adjusted threshold value of 72%. Accordingly, per step 315 the server application automatically maps from Source Application A and Source Application B to Target Application C all data fields associated with Workflow X for which a mapping confidence value meets or exceeds the first adjusted confidence level threshold value of 72%. As indicated by the row set 804 of column 840 of table 800 associated with the first adjusted threshold value of 72%, per step 315 the server application automatically maps 262 data fields out of the 500 total data fields based upon the first adjusted threshold value. Per step 320, the server application receives mapping evaluations from each of Users 1-5 for each automatic data field mapping based upon the confidence level threshold set at the first adjusted value of 72%, such that each automatic data field mapping approved by the user is labelled a true positive and each automatic data field mapping rejected by the user is labelled a false positive. The true positive mappings associated with the first adjusted threshold value of 72%, i.e., the automatic data field mappings that are user-approved, are reflected in the row set 804 of column 850 of table 800. The false positive mappings associated with the first adjusted threshold value of 72%, i.e., the automatic data field mappings that are user-rejected, are reflected in the row set 804 of column 860 of table 800.

Per step 325, in the context of the example scenario, it is assumed that a second confidence level threshold adjustment input selection is received by the server application prior to expiration of the application integration session. Accordingly, in the context of processing at least one confidence level threshold adjustment input selection made during Integration Session 1 in accordance with step 220, the server application returns to step 305, where the server application receives from one of Users 1-5 a second adjusted value associated with a second confidence level threshold adjustment input selection during the application integration session. As indicated in threshold value column 810 of table 800, it is assumed for purposes of the example scenario that the second adjusted value received from one of Users 1-5 is 60%, or, e.g., 60 on the predefined scale from 0 to 100. Per step 310, the server application adjusts the confidence level threshold value from the first adjusted threshold value of 72% to the second adjusted threshold value of 60%. Per step 315, the server application automatically maps, via the mapping recommendation model, all data fields among the plurality of data fields for which a mapping confidence value is greater than or equal to the confidence level threshold set at the second adjusted threshold value of 60%. Accordingly, per step 315 the server application automatically maps from Source Application A and Source Application B to Target Application C all data fields associated with Workflow X for which a mapping confidence value meets or exceeds the second adjusted confidence level threshold value of 60%. As indicated by the row set 806 of column 840 of table 800 associated with the second adjusted threshold value of 60%, per step 315 the server application automatically maps 380 data fields out of the 500 total data fields based upon the second adjusted threshold value. Per step 320, the server application receives mapping evaluations from each of Users 1-5 for each automatic data field mapping based upon the confidence level threshold set at the second adjusted value of 60%, such that each automatic data field mapping approved by the user is labelled a true positive and each automatic data field mapping rejected by the user is labelled a false positive. The true positive mappings associated with the second adjusted threshold value of 60%, i.e., the automatic data field mappings that are user-approved, are reflected in the row set 806 of column 850 of table 800. The false positive mappings associated with the second adjusted threshold value of 60%, i.e., the automatic data field mappings that are user-rejected, are reflected in the row set 806 of column 860 of table 800. Per step 325, it is assumed that no further confidence level threshold adjustment input selection is received by the server application following the second confidence level threshold adjustment input selection prior to expiration of the application integration session, and accordingly the server application proceeds to the end of the method 300.

Per step 225, in the context of the example scenario, the server application derives at least one candidate default confidence level threshold value based upon the two confidence level threshold adjustment input selections processed in accordance with step 220. More specifically, per step 405 of the method 400, the server application calculates an average default precision value measuring automatic mapping precision based upon the confidence level threshold set at the default value of 90%. Even more specifically, per step 505 of the method 500, the server application calculates a set of default precision values for Users 1-5 by computing a quantity of true positives divided by a sum of the quantity of true positives and a quantity of false positives as determined from the mapping evaluations based upon the confidence level threshold set at the default threshold value of 90%. The set of default precision values includes a respective default precision value calculated for each of Users 1-5. Accordingly, the server application calculates a default precision value for a respective user among Users 1-5 by dividing a true positive value as reflected in a row corresponding to the respective user among the row set 802 of true positive column 850 of table 800 by a sum of the true positive value and a false positive value as reflected in a row corresponding to the respective user among the row set 802 of false positive column 860 of table 800. The set of default precision values are reflected in the row set 802 of column 870 of table 800. Per step 510, the server application averages the set of default precision values calculated for Users 1-5 to obtain the average default precision value. According to step 510, the server application averages the respective default precision values calculated for each of Users 1-5 as reflected in the row set 802 of column 870 of table 800. The average default precision value is reflected in cell 892 of column 880 of table 800. Per step 410, the server application calculates a first average adjusted precision value measuring automatic mapping precision based upon the confidence level threshold set at the first adjusted value of 72%. Even more specifically, per step 605 of the method 600, the server application calculates a set of first adjusted precision values for Users 1-5 by computing a quantity of true positives divided by a sum of the quantity of true positives and a quantity of false positives as determined from the mapping evaluations based upon the confidence level threshold set at the first adjusted value of 72%. The set of first adjusted precision values includes a first adjusted precision value calculated for each of Users 1-5. Accordingly, the server application calculates a first adjusted precision value for a respective user among Users 1-5 by dividing a true positive value as reflected in a row corresponding to the respective user among the row set 804 of true positive column 850 of table 800 by a sum of the true positive value and a false positive value as reflected in a row corresponding to the respective user among the row set 804 of false positive column 860 of table 800. The set of first adjusted precision values are reflected in the row set 804 of column 870 of table 800. Per step 610, the server application averages the set of first adjusted precision values calculated for Users 1-5 to obtain the average first adjusted precision value. According to step 610, the server application averages the respective first adjusted precision values calculated for each of Users 1-5 as reflected in the row set 804 of column 870 of table 800. The average first adjusted precision value is reflected in cell 894 of column 880 of table 800. Per step 415, the server application determines whether the average first adjusted precision value as reflected in cell 894 of table 800 is greater than or equal to the average default precision value as reflected in cell 892 of table 800. Since the average first adjusted precision value is greater than the average default precision value, per step 420 the server application stores the first adjusted threshold value of 72% as a candidate default confidence level threshold value among the at least one candidate default confidence level threshold value.

Per step 425, in the context of the example scenario, since there is a second adjusted threshold value to be processed, the server application returns to step 410, where the server application calculates a second average adjusted precision value measuring automatic mapping precision based upon the confidence level threshold set at the second adjusted value of 60%. Even more specifically, per step 605 of the method 600, the server application calculates a set of second adjusted precision values for Users 1-5 by computing a quantity of true positives divided by a sum of the quantity of true positives and a quantity of false positives as determined from the mapping evaluations based upon the confidence level threshold set at the second adjusted value of 60%. The set of second adjusted precision values includes a second adjusted precision value calculated for each of Users 1-5. Accordingly, the server application calculates a second adjusted precision value for a respective user among Users 1-5 by dividing a true positive value as reflected in a row corresponding to the respective user among the row set 806 of true positive column 850 of table 800 by a sum of the true positive value and a false positive value as reflected in a row corresponding to the respective user among the row set 806 of false positive column 860 of table 800. The set of second adjusted precision values are reflected in the row set 806 of column 870 of table 800. Per step 610, the server application averages the set of second adjusted precision values calculated for Users 1-5 to obtain the average second adjusted precision value. According to step 610, the server application averages the respective second adjusted precision values calculated for each of Users 1-5 as reflected in the row set 806 of column 870 of table 800. The average second adjusted precision value is reflected in cell 896 of column 880 of table 800. Per step 415, the server application determines whether the average second adjusted precision value as reflected in cell 896 of table 800 is greater than or equal to the average default precision value as reflected in cell 892 of table 800. Since the average second adjusted precision value is greater than the average default precision value, per step 420 the server application stores the second adjusted threshold value of 60% as a candidate default confidence level threshold value among the at least one candidate default confidence level threshold value. Per step 425, since there is no further adjusted threshold value to be processed beyond the second adjusted threshold value, the server application proceeds to the end of the method 400, and thus derivation of the at least one candidate default confidence level threshold per step 225 ends.

Per step 230, in the context of the example scenario, the server application adjusts a default value setting associated with the confidence level threshold to an updated default value selected among the at least one candidate default confidence level threshold value, i.e., the candidate confidence level threshold values of 72% and 60%. For purposes of this example scenario it is assumed in accordance with a previously described embodiment that the server application selects the updated default value in view of statistical precision calculated from mapping evaluation data. Accordingly, the server application selects 72% as the updated default precision value per statistical precision, since the 72% threshold value is associated with highest average precision based upon comparison of respective cells 892, 894, and 896 of table 800.

Per step 235, in the context of the example scenario, the server application integrates the workflow during a subsequent application integration session, e.g., an Integration Session 2 for Workflow X involving Users 5 and 6, based upon the confidence level threshold initially set at the updated default value of 72%. Accordingly, mapping of the plurality of data fields from Source Application A and Source Application B to Target Application C may proceed per steps of the method 700. In the context of the method 700, responsive to determining according to step 740 that there is a further application integration session for the workflow, e.g., an Integration Session 3 for Workflow X involving User 7, per step 745 the server application integrates the further application integration session for the workflow based upon the confidence level threshold initially set at a subsequent updated default value per steps analogous to those of the method 700.

The descriptions of the various embodiments have been presented for purposes of illustration but are not intended to be exhaustive or limited to the embodiments disclosed. All kinds of modifications made to the described embodiments and equivalent arrangements should fall within the protected scope of the various embodiments. Hence, the scope should be explained most widely according to the claims that follow in connection with the detailed description and should cover all possibly equivalent variations and equivalent arrangements. Many modifications and variations will be apparent to those of ordinary skill in the art without departing from the scope and spirit of the described embodiments. The terminology used herein is chosen to best explain the principles of the various embodiments, the practical application or technical improvement over technologies found in the marketplace, or to enable others of ordinary skill in the art to understand the various embodiments.

What is claimed is:

1. A computer-implemented method comprising:
   receiving from at least one user a request to map from at least one source application to a target application a plurality of data fields associated with a workflow during an application integration session;
   automatically mapping, via a machine learning mapping recommendation model, all data fields among the plurality of data fields for which a mapping confidence value is greater than or equal to a confidence level threshold set at a default value;
   receiving from one of the at least one user an adjusted value associated with one of at least one confidence level threshold adjustment input selection;
   automatically mapping, via the machine learning mapping recommendation model, all data fields among the plurality of data fields for which a mapping confidence value is greater than or equal to the confidence level threshold set at the adjusted value;
   calculating average default automatic mapping precision in view of user mapping evaluations based upon the confidence level threshold set at the default value;
   calculating average adjusted automatic mapping precision in view of user mapping evaluations based upon the confidence level threshold set at the adjusted value; and
   storing the adjusted value as a candidate default confidence level threshold value among at least one candidate default confidence level threshold value responsive to determining that the average adjusted automatic mapping precision is greater than or equal to the average default automatic mapping precision.

2. The computer-implemented method of claim 1, further comprising:
   adjusting a default value setting associated with the confidence level threshold to an updated default value selected among the at least one candidate default confidence level threshold value.

3. The computer-implemented method of claim 2, wherein selecting the updated default value comprises analyzing, via the machine learning mapping recommendation model, each of the at least one candidate default confidence level threshold value in view of mapping history associated with the at least one user.

4. The computer-implemented method of claim 3, wherein the mapping history includes cumulative mapping history data from any application integration session preceding the application integration session.

5. The computer-implemented method of claim 3, wherein the mapping history includes any mapping evaluations made by one or more other users having a degree of similarity with one or more of the at least one user above a predefined user similarity threshold.

6. The computer-implemented method of claim 2, wherein selecting the updated default value comprises analyzing, via the machine learning mapping recommendation model, each of the at least one candidate default confidence level threshold value in view of statistical precision calculated from mapping evaluation data.

7. The computer-implemented method of claim 6, wherein analyzing each of the at least one candidate default confidence level threshold value in view of statistical precision calculated from the mapping evaluation data comprises comparing precision calculations based upon any confidence level threshold modifications made during one or more application integration sessions preceding the application integration session.

8. The computer-implemented method of claim 2, further comprising:
   integrating the workflow during a subsequent application integration session based upon the confidence level threshold initially set at the updated default value.

9. The computer-implemented method of claim 1, wherein the user mapping evaluations based upon the confidence level threshold set at the default value include each user-approved automatic data field mapping labelled as a true positive and each user-rejected automatic data field mapping labelled as a false positive.

10. The computer-implemented method of claim 9, wherein calculating the average default automatic mapping precision comprises:
    calculating a set of default precision values for the at least one user by computing a quantity of true positives divided by a sum of the quantity of true positives and a quantity of false positives as determined from the user mapping evaluations based upon the confidence level threshold set at the default value; and
    averaging the set of default precision values calculated for the at least one user to obtain the average default automatic mapping precision.

11. The computer-implemented method of claim 1, wherein the user mapping evaluations based upon the confidence level threshold set at the adjusted value include each user-approved automatic data field mapping labelled as a true positive and each user-rejected automatic data field mapping labelled as a false positive.

12. The computer-implemented method of claim 11, wherein calculating the average adjusted automatic mapping precision comprises:
    calculating a set of adjusted precision values for the at least one user by computing a quantity of true positives divided by a sum of the quantity of true positives and a quantity of false positives as determined from the user mapping evaluations based upon the confidence level threshold set at the adjusted value; and
    averaging the set of adjusted precision values calculated for the at least one user to obtain the average adjusted automatic mapping precision.

13. A computer program product comprising a computer readable storage medium having program instructions embodied therewith, the program instructions executable by a computing device to cause the computing device to:

receive from at least one user a request to map from at least one source application to a target application a plurality of data fields associated with a workflow during an application integration session;

automatically map, via a machine learning mapping recommendation model, all data fields among the plurality of data fields for which a mapping confidence value is greater than or equal to a confidence level threshold set at a default value;

receive from one of the at least one user an adjusted value associated with one of at least one confidence level threshold adjustment input selection;

automatically map, via the machine learning mapping recommendation model, all data fields among the plurality of data fields for which a mapping confidence value is greater than or equal to the confidence level threshold set at the adjusted value;

calculate average default automatic mapping precision in view of user mapping evaluations based upon the confidence level threshold set at the default value;

calculate average adjusted automatic mapping precision in view of user mapping evaluations based upon the confidence level threshold set at the adjusted value; and store the adjusted value as a candidate default confidence level threshold value among at least one candidate default confidence level threshold value responsive to determining that the average adjusted automatic mapping precision is greater than or equal to the average default automatic mapping precision.

14. The computer program product of claim 13, wherein the program instructions further cause the computing device to:
adjust a default value setting associated with the confidence level threshold to an updated default value selected among the at least one candidate default confidence level threshold value.

15. The computer program product of claim 13, wherein the user mapping evaluations based upon the confidence level threshold set at the default value include each user-approved automatic data field mapping labelled as a true positive and each user-rejected automatic data field mapping labelled as a false positive.

16. The computer program product of claim 13, wherein the user mapping evaluations based upon the confidence level threshold set at the adjusted value include each user-approved automatic data field mapping labelled as a true positive and each user-rejected automatic data field mapping labelled as a false positive.

17. A system comprising:
at least one processor; and
a memory storing an application program, which, when executed on the at least one processor, performs an operation comprising:

receiving from at least one user a request to map from at least one source application to a target application a plurality of data fields associated with a workflow during an application integration session;

automatically mapping, via a machine learning mapping recommendation model, all data fields among the plurality of data fields for which a mapping confidence value is greater than or equal to a confidence level threshold set at a default value;

receiving from one of the at least one user an adjusted value associated with one of at least one confidence level threshold adjustment input selection;

automatically mapping, via the machine learning mapping recommendation model, all data fields among the plurality of data fields for which a mapping confidence value is greater than or equal to the confidence level threshold set at the adjusted value;

calculating average default automatic mapping precision in view of user mapping evaluations based upon the confidence level threshold set at the default value:

calculating average adjusted automatic mapping precision in view of user mapping evaluations based upon the confidence level threshold set at the adjusted value; and storing the adjusted value as a candidate default confidence level threshold value among at least one candidate default confidence level threshold value responsive to determining that the average adjusted automatic mapping precision is greater than or equal to the average default automatic mapping precision.

18. The system of claim 17, wherein the operation further comprises:
adjusting a default value setting associated with the confidence level threshold to an updated default value selected among the at least one candidate default confidence level threshold value.

19. The system of claim 17, wherein the user mapping evaluations based upon the confidence level threshold set at the default value include each user-approved automatic data field mapping labelled as a true positive and each user-rejected automatic data field mapping labelled as a false positive.

20. The system of claim 17, wherein the user mapping evaluations based upon the confidence level threshold set at the adjusted value include each user-approved automatic data field mapping labelled as a true positive and each user-rejected automatic data field mapping labelled as a false positive.

* * * * *